United States Patent [19]
Saito et al.

[11] Patent Number: 5,572,390
[45] Date of Patent: Nov. 5, 1996

[54] MAGNETIC HEAD INCLUDING AN APEX PORTION WITH TWO CHAMFERED PORTIONS HAVING OPTIMIZED ANGLES

[75] Inventors: Kazuhiro Saito; Osamu Murata; Tatsushi Shimizu, all of Toda, Japan

[73] Assignee: Japan Energy Corporation, Tokyo, Japan

[21] Appl. No.: 590,962

[22] Filed: Jan. 24, 1996

Related U.S. Application Data

[63] Continuation of Ser. No. 175,386, filed as PCT/JP93/01218, Aug. 30, 1993 published as WO 94/11862, May 26, 1994, abandoned.

[30] Foreign Application Priority Data

Nov. 11, 1992 [JP] Japan ............................ 4-326016
Feb. 16, 1993 [JP] Japan ............................ 5-050112

[51] Int. Cl.⁶ ............................................. G11B 5/23
[52] U.S. Cl. ..................................................... 360/119
[58] Field of Search ................................. 360/119, 120, 360/125, 126, 103, 104, 119, 120, 123, 125, 126

[56] References Cited

U.S. PATENT DOCUMENTS

| | | | |
|---|---|---|---|
| 4,434,445 | 2/1984 | Van Herk | 360/121 |
| 4,768,118 | 8/1988 | Kuriyana | 360/121 |
| 4,805,058 | 2/1989 | Takeuchi et al. | 360/119 |
| 4,951,166 | 8/1990 | Schewe | 360/119 |
| 5,173,821 | 12/1992 | Maloney | 360/119 |
| 5,245,488 | 9/1993 | Iwamoto et al. | 360/119 |
| 5,276,575 | 1/1994 | Kobayashi et al. | 360/126 |

FOREIGN PATENT DOCUMENTS

| | | | |
|---|---|---|---|
| 53-20912 | 2/1978 | Japan . | |
| 53-20911 | 2/1978 | Japan . | |
| 63-46608 | 2/1988 | Japan | 360/119 |
| 63-213106 | 9/1988 | Japan . | |
| 3-84711 | 4/1991 | Japan . | |

OTHER PUBLICATIONS

Valstyn, Erich P. et al. "Optimization of Ferrite Heads for Thin Media," *IEEE Transactions on Magnetics*, vol. MAG-22, No. 5, Sep. 1986, 847-9.

*Primary Examiner*—A. J. Heinz
*Assistant Examiner*—Paul J. Ditmyer
*Attorney, Agent, or Firm*—Panitch Schwarze Jacobs & Nadel, P.C.

[57] ABSTRACT

A magnetic head is provided with an apex portion having a first and second chamfered portion, both formed in a C core. The first chamfered portion has a first apex angle α at a position corresponding to a predetermined gap depth. The first chamfered portion also has a predetermined apex length. The second chamfered portion is contiguous to the first chamfered portion and has second apex angle β which is smaller than the first apex angle α. The first apex angle α is greater than or equal to 70° and less than 80°.

11 Claims, 8 Drawing Sheets

MAGNETIC HEAD INCLUDING AN APEX PORTION WITH TWO CHAMFERED PORTIONS HAVING OPTIMIZED ANGLES

This is a continuation of application Ser. No. 08/175,386, filed as PCT/JP93/01218, Aug. 30, 1993 published as WO94/11862, May 26, 1994, now abandoned.

FIELD OF THE INVENTION

This invention relates to a magnetic head obtained by face-to-face bonding together with two magnetic core halves, i.e., an I core and a C core, each having a thin magnetic film, with a predetermined gap length therebetween.

More particularly, the invention concerns a magnetic head, which employs a soft magnetic thin film such as an Fe-Si-Al alloy magnetic film and can be used suitably as high density recording heads, for which high frequency and high signal-to-noise ratio are required, mainly video heads, computer heads, etc.

BACKGROUND OF THE INVENTION

FIG. 6 shows an example of a laminated thin film type magnetic head using an Fe-Si-Al alloy magnetic film, which has recently been used suitably as video heads, computer heads, etc. The structure of this head will now be described briefly.

As shown in FIG. 6, the laminated thin film type magnetic head 1 has a pair of magnetic core halves, i.e., an I core 2 and a C core 4, each of them having a laminated thin film obtained by depositing an Fe-Si-Al alloy thin film 100 on a ceramic substrate, for instance. The I and C cores 2 and 4 have their mating surfaces bonded together via a gap 6. Generally, in such a magnetic head, a chamfered portion or an apex portion 8 is formed adjacent the gap 6 by machining in order to obtain magnetic flux concentration. To bond core halves toughly together this portion is filled with apex glass 10. The structure is then subjected to further processing depending on the purpose, such as for a computer or for a video.

The prior art magnetic head 1, used as a composite type slider of a hard disk drive, is usually classified into two large types determined by the shape of the apex portion 8. In one type of magnetic head, as shown in FIG. 7, the apex space 8 comprises a chamfered portion 12, which is formed in the C core 4 such as to have apex angle $\alpha$, usually around $\alpha=45°$, at a position (i.e., apex) with a predetermined gap depth D, and another chamfered portion 14, which is formed as desired in the I core 2 such as to have an angle $\theta$, usually around $\theta=45°$ (this magnetic head being hereinafter referred to as "A type magnetic head"). In the other type of magnetic head, as shown in FIG. 8, the apex portion 8 comprises chamfered portions 16 and 18 both formed in the C core 4 with an apex angle $\alpha$ of substantially 90° and an apex length of T (this magnetic head being hereinafter referred to as "B type magnetic head").

In the A and B type magnetic heads of the above structures, it is well known in the art that, as will be understood from FIG. 9, in the B type magnetic head (FIG. 8) the magnetic flux saturation takes place first not in the gap but in the vicinity of the contact between the chamfered portions 16 and 18, so that the field gradient formed by the gap is substantially fixed irrespective of the increase of magnetomotive force. In the A type magnetic head (FIG. 7), on the other hand, the magnetic flux saturation takes place first at the C core beside the gap, thus giving rise to the so called "roll-off" phenomenon, that is, reduction of the field gradient formed by the gap with magnetomotive force increase. This means that, the A type magnetic head has a problem in recording demagnetization that the reproduction output is reduced by increasing the recording current.

FIG. 9 shows the field gradient which are calculated with a floating level of 0.1 μm, a switching field of 1,600 Oe and a gap depth of 4 μm. The field gradient is a gradient of the recording magnetic field from the head, with respect to the magnetomotive force, corresponding to the magnitude of the switching field of magnetic medium at a position spaced apart a distance corresponding to the floating level.

Comparing the magnetic heads of both types in the reading (or play back) efficiency ($\eta$) in the gap, i.e., $\eta$=(gap length×magnetic field intensity in gap)/(magnetomotive force in ampere-turns), as will be seen from Table 1 below, it was found that B type magnetic heads has the following problems. Namely, the B type magnetic head is inferior in the play back efficiency to the A type magnetic head irrespective of the gap depth (D) so that it can not provide sufficient play back voltage.

TABLE 1

| Gap depth D | A type | B type |
| --- | --- | --- |
| 1 μm | 84.9% | 69.8% |
| 4 μm | 64.9% | 60.1% |
| 10 μm | 59.1% | 56.1% |

It was thus found that the shape of the apex portion 8 has great influence on the magnetic properties of the magnetic head 1.

DISCLOSURE OF THE INVENTION

An object of the invention is to provide a magnetic head, which is excellent in both the properties of recording demagnetization and play back efficiency.

In summary, according to the invention there is provided a magnetic head comprising a pair of magnetic core halves with mating surfaces thereof bonded together via a gap, an apex portion being formed adjacent the gap, the apex portion having a first and second chamfered portion both formed in one of the magnetic core halves, the first chamfered portion being formed such as to have a first apex angle ($\alpha$) at a position (D) corresponding to a predetermined gap depth and have a predetermined apex length, the second chamfered portion being contiguous to the first chamfered portion and having a second apex angle ($\beta$) smaller than the first apex angle ($\alpha$). The first and second chamfered portions may be formed such that they have straight or curved profiles. Preferably, the first apex angle ($\alpha$) is in a range between 70° and 90°, while the second apex angle ($\beta$) is in a range between 15° and 70°.

In another embodiment of the invention, the apex portion further has a third chamfered portion formed in the other magnetic core half, the third chamfered portion being formed such as to have a third apex angle $\theta$ at a position D' beyond the gap depth position noted above. The third apex angle $\theta$ is usually about 45°.

BEST MODES OF CARRYING OUT THE INVENTION

Now, the magnetic head according to the invention will be described in more detail with reference to the drawings.

Embodiment 1

Figure 1A:
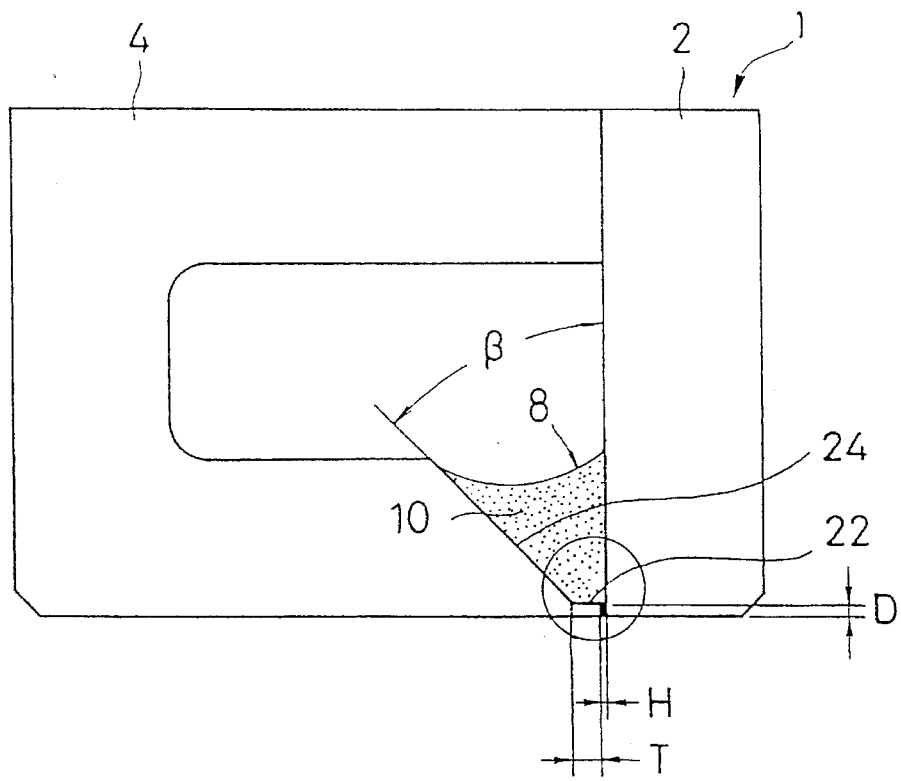
FIG. 1A is a front view showing an embodiment of the magnetic head according to the invention.

FIG. 1A shows an embodiment of magnetic head 1 according to the invention. This embodiment, like the prior art magnetic head, comprises magnetic core halves, i.e., an I core and a C core 2 and 4, each of them having a laminated thin film structure obtained by depositing an Fe-Si-Al alloy thin film on a non-magnetic substrate, for instance a ceramic substrate, the I and C cores 2 and 4 having their mating surfaces bonded together via a gap 6.

In this embodiment, the chamfered portion, i.e., apex portion 8, that is formed adjacent the gap 6 by machining, is defined by forming a first chamfered portion 22 and a second chamfered portion 24 in the C core 4. The I core 2 is not provided with any particular machining for forming the apex portion 8. The apex portion 8 is filled with apex glass 10.

Figure 1B:
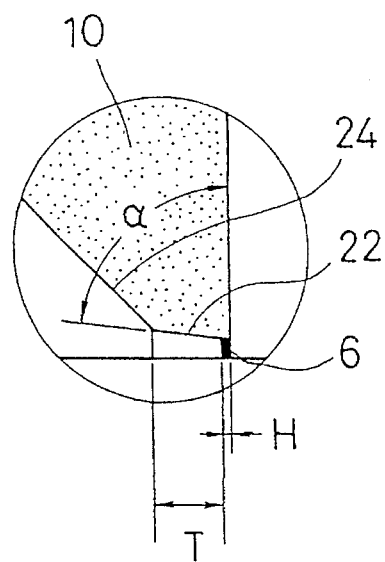
FIG. 1B is an enlarged-scale fragmentary front view of the circled portion of FIG. 1A.

In further detail, shown in FIG. 1B the first chamfered portion 22 in the apex portion 8 is formed in the C core 4 such as to have a first chamfer angle, i.e., first apex angle α, at a position (apex) of a predetermined gap depth D and also have a predetermined apex length T. The second chamfered portion 24 is contiguous to the first chamfered portion 22 and is formed such as to have a second chamfer angle, i.e., second apex angle β. The first and second apex angles α and β, as shown, refer to an opening angle with respect to a plane parallel to the mating surfaces of the I and C cores 2 and 4, and the apex length T refers to the distance measured from the plane of the gap 6 in the direction normal to the parallel plane noted above. In this embodiment, satisfactory results are obtainable by setting the first apex angle α to 84°, the apex length T to 50 μm and the second apex angle β to 45°.

Figure 8:
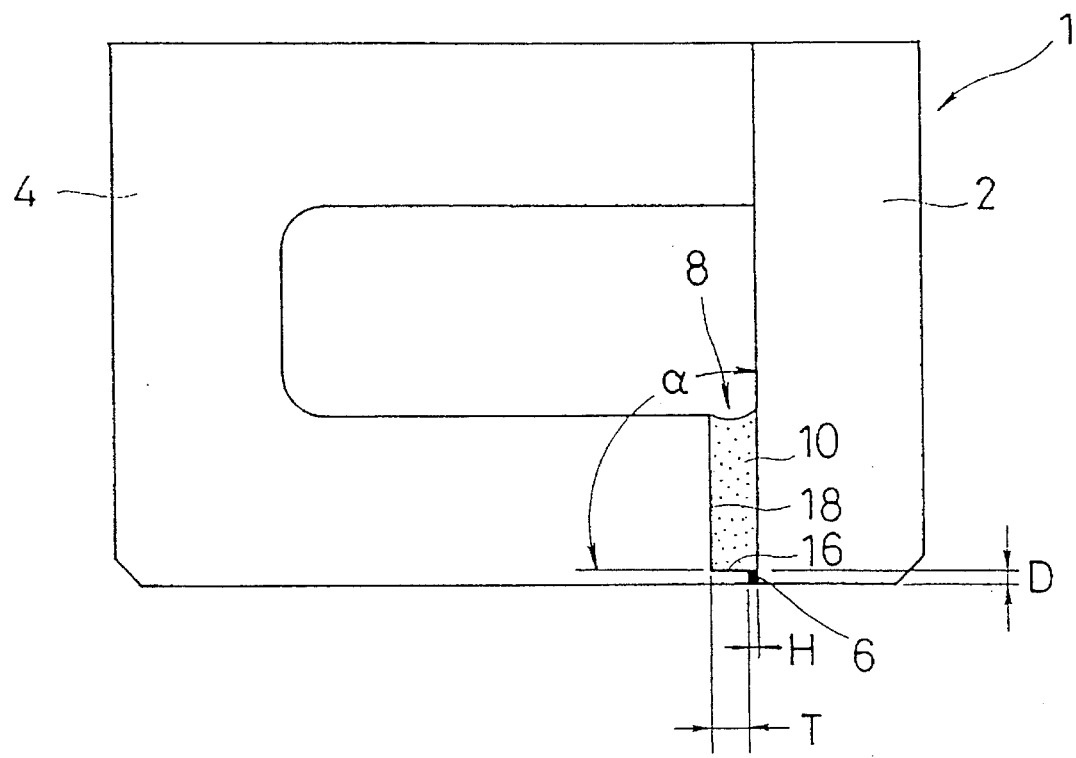
FIG. 8 is a front view showing a different example of the magnetic head.
Figure 9:
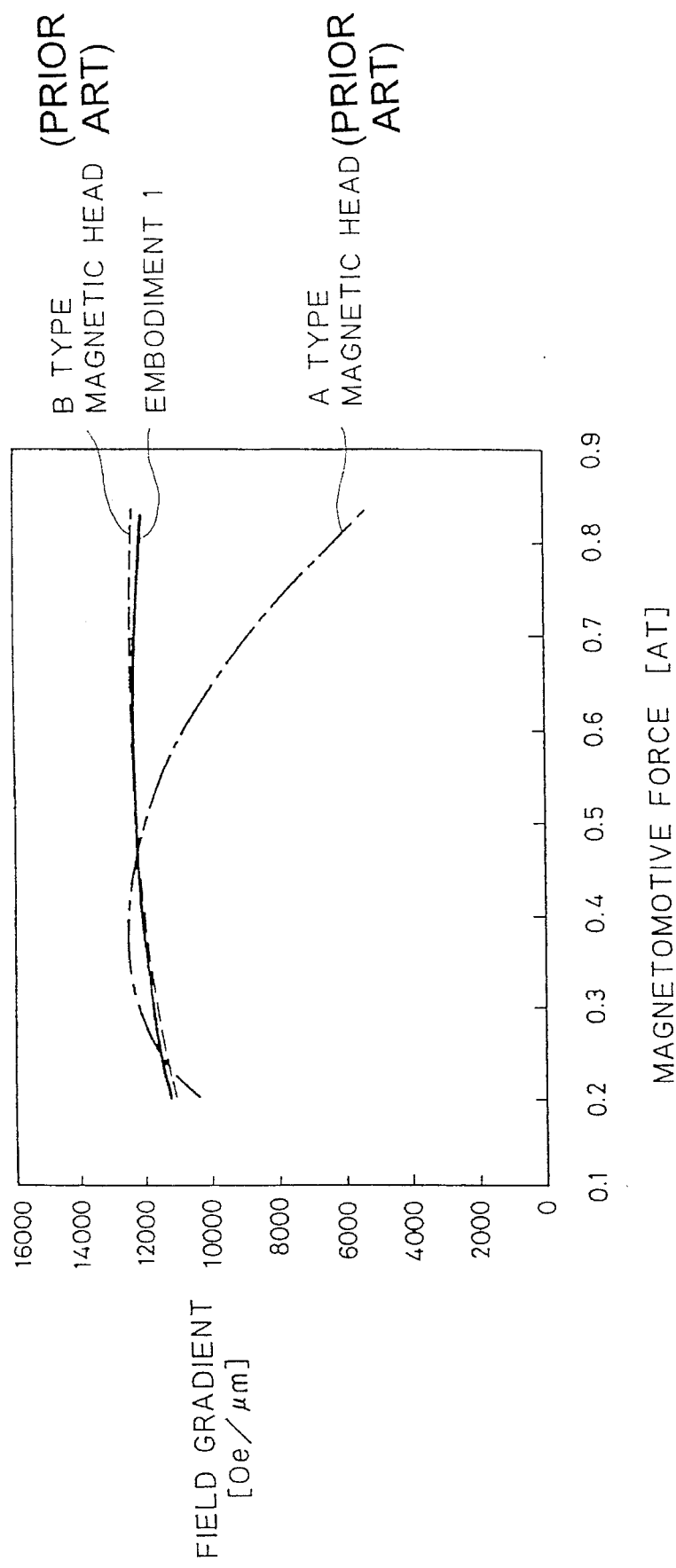
FIG. 9 is a graph showing roll-off characteristics of magnetic heads according to the invention and in the prior art.

The result of calculation of the field gradient with the magnetic head 1A having the shape as shown in FIG. 1 with the gap depth D set to 4 μm, is shown in FIG. 9. It can be seen from FIG. 9 that with the magnetic head 1 having the structure of Embodiment 1 the field gradient is substantially constant irrespective of the increase of magnetomotive force, and no roll-off is generated. In other words, this magnetic head, like the B type magnetic head (FIG. 8) described earlier, is free from the problem of recording demagnetization, that is, the play back output is not reduced by increasing the recording current.

The reading (play back) efficiency η in the gap was calculated to obtain results as shown in Table 2 below. As is seen from this Table 2 and also Table 1 given before, with the magnetic head in Embodiment 1 it is possible to attain a play back efficiency equal to or higher than that of the A type magnetic head.

TABLE 2

| Gap depth D | Embodiment 1 | Embodiment 2 |
| --- | --- | --- |
| 1 μm | 83.1% | 80.6% |
| 4 μm | 65.8% | 64.0% |
| 10 μm | 59.2% | 57.3% |

Further, for examining the relation between the first apex angle α and play back efficiency in the magnetic head 1 in Embodiment 1, the inventors calculated the play back efficiency by setting various values of the first apex angle α while holding the second apex angle β 45° (constant). The results are shown in Table 3. It will be seen from Table 3 that the play back efficiency of the magnetic head is reduced with increase of the first apex angle α.

TABLE 3

| Gap depth D | 45° | 60° | 65° | 70° | 75° | 80° | 84° | 87° | 90° |
| --- | --- | --- | --- | --- | --- | --- | --- | --- | --- |
| 4 μm | 74.1 | 69.9 | 69.2 | 68.6 | 67.8 | 66.9 | 65.8 | 64.5 | 62.4 |
| 10 μm | 61.8 | 61.7 | 61.5 | 61.3 | 60.9 | 60.5 | 59.9 | 59.4 | 58.7 |

Further, for examining the relation between the second apex angle β and play back efficiency in the magnetic head in Embodiment 1, the play back efficiency was calculated by setting various values of the second apex angle β while holding the first apex angle α at 90° (constant). The results are shown in Table 4. As is seen from Table 4, the play back efficiency of the magnetic head 1 is highest when the second apex angle β is around 45° and is equal to or lower than that of the B type magnetic head when the second apex angle β is below 15° and above 70°. It will be seen from this embodiment that with the magnetic head 1 according to the invention the second apex angle β is between 15° or above (preferably 30° or above) and (70° or below) (preferably 60° or below).

TABLE 4

| Gap depth D | 15° | 30° | 45° | 60° | 70° |
| --- | --- | --- | --- | --- | --- |
| 4 μm | 59.1 | 61.0 | 62.4 | 60.9 | 59.7 |
| 10 μm | 56.4 | 57.3 | 58.7 | 57.2 | 56.0 |

Figure 2:
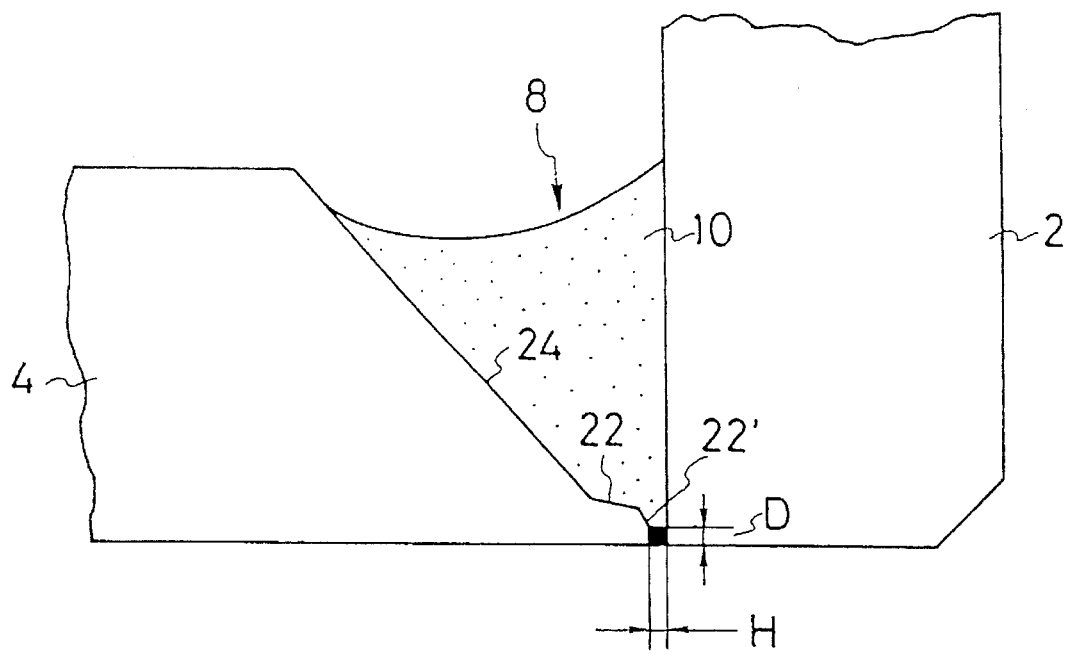
FIG. 2 is an enlarged-scale fragmentary front view showing a different embodiment of the magnetic head according to the invention.
Figure 10:
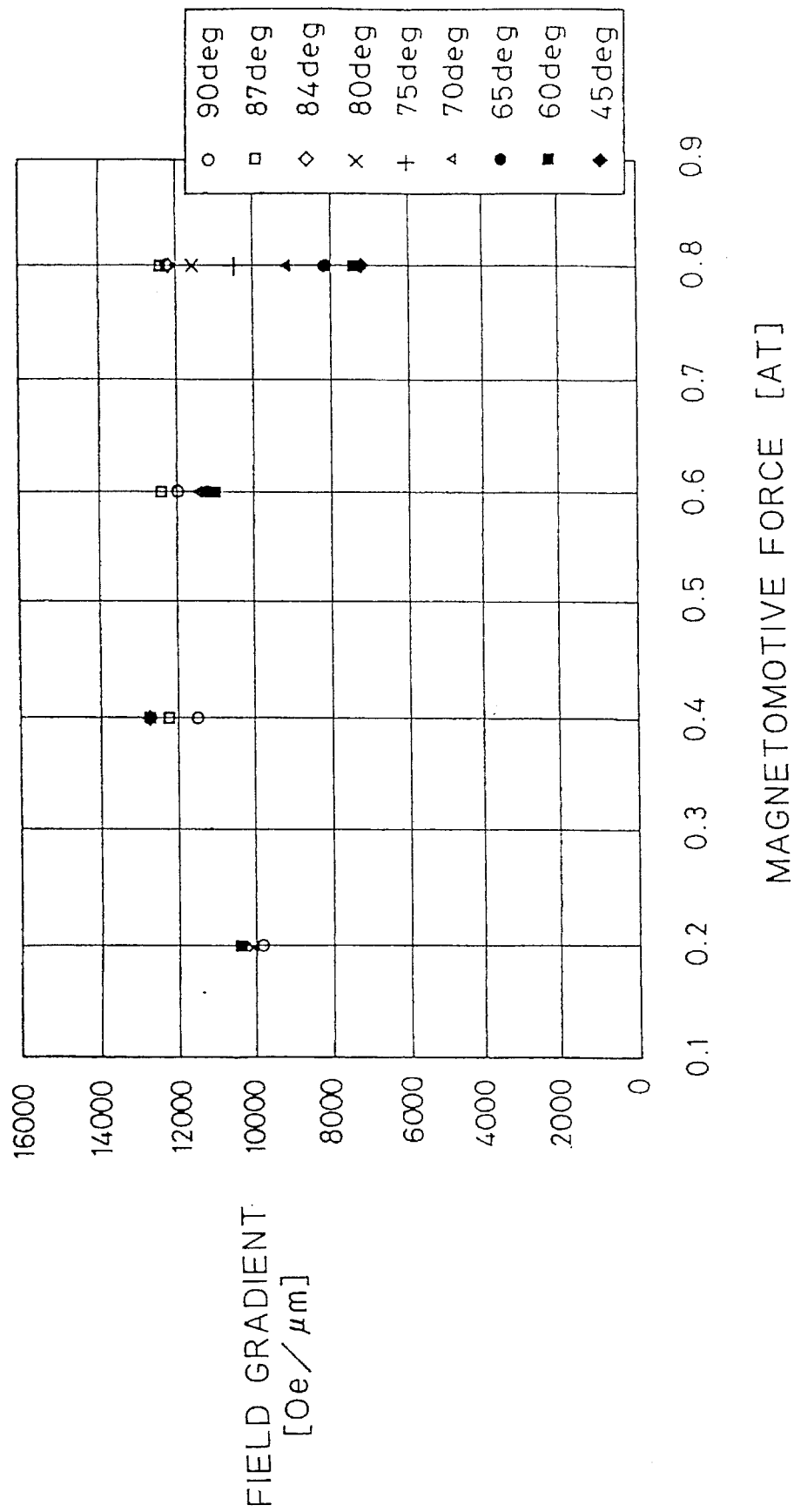
FIG. 10 is a graph showing the relation between the apex angle α and roll-off characteristic in the magnetic heads according to the invention.

Further, the relation between, the apex angles α and β and roll-off (recording demagnetization) in the magnetic head 1 in this embodiment was examined to find that the roll-off is not influenced by the second apex angle β but is changed in dependence on the first apex angle α alone. The results are shown in FIG. 10. It will be seen from FIG. 10 that the roll-off is pronounced when the first apex angle α is made below 70°. For this reason, the first apex angle α is set to be 70° or above (preferably 75° or above) and 90° or below. In the magnetic head 1 according to the invention, if necessary, a chamfered portion 22', may be formed at the corner of the first chamfered portion 22 adjacent the mating surface forming the gap 6 such that the gap depth D is not substantially changed, as shown in FIG. 2. With this structure, the same effects as noted above are obtainable.

Figure 3:
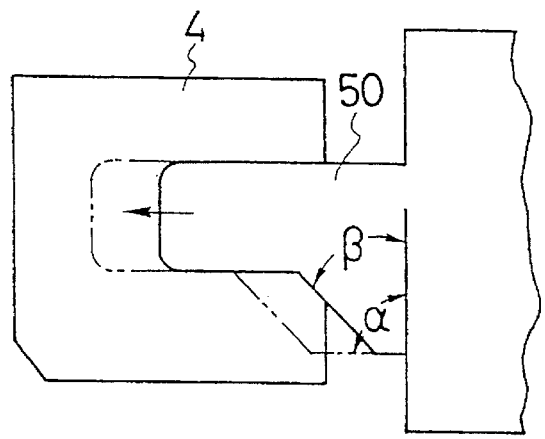
FIG. 3 is a front view showing an example of cutting blade for processing the magnetic head according to the invention.

According to the invention, since the C core 4 is formed with the first and second chamfered portions 22 and 24, an increase of the processing steps is anticipated. However, this problem can be solved by using a cutting blade 50 having the two angles α and β, as shown in FIG. 3.

Further, as can be understood from the above description, with the magnetic head according to the invention substantially the same bonding strength as in the prior art magnetic head is obtainable by providing the molding with the apex glass 10 up to the second chamfered portion 24.

Embodiment 2

Figure 4A:
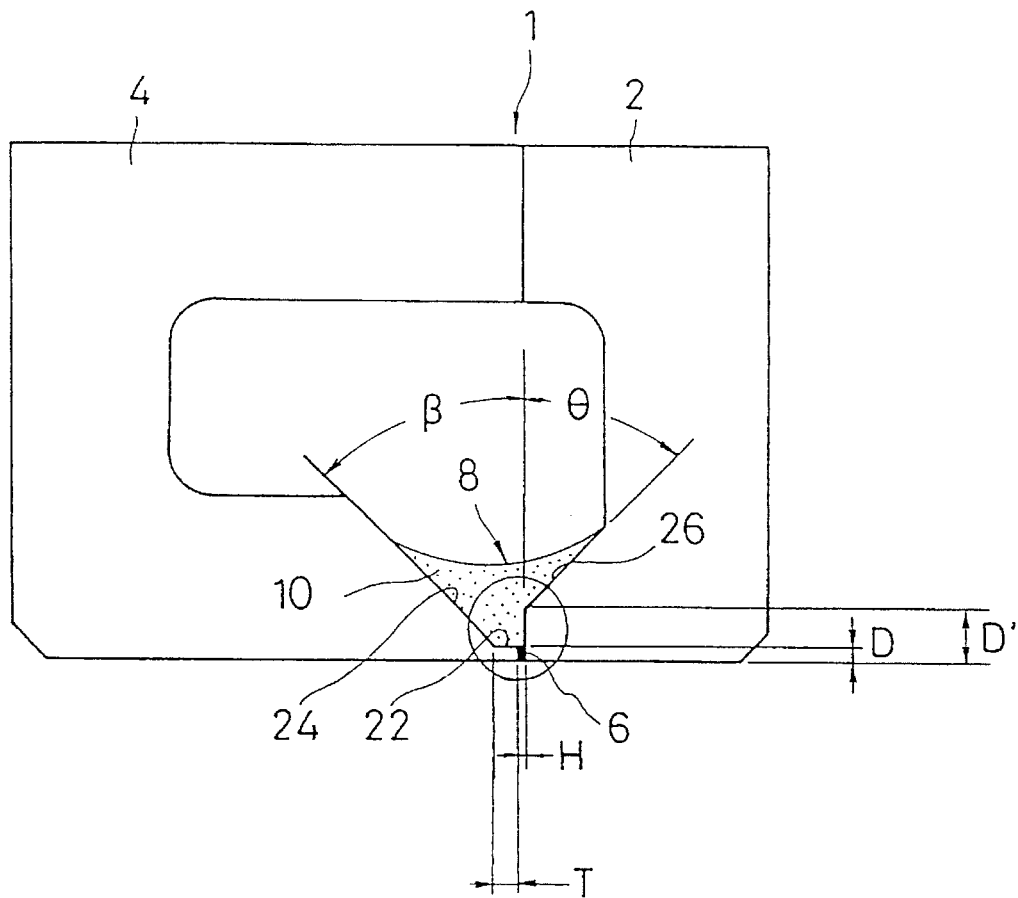
FIG. 4A is a front view showing a further embodiment of the magnetic head according to the invention.
Figure 4B:
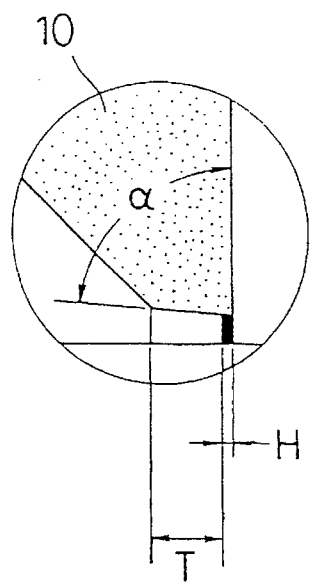
FIG. 4B is an enlarged-scale fragmentary front view of the circled portion of FIG. 4A.

FIGS. 4A and 4B show Embodiment 2 of the invention. This embodiment of the magnetic head 1 is the same in structure as Embodiment 1 except that a third chamfered portion 26 at an angle θ is formed on the side of the I core 2. The start position D' of the third chamfered portion 26 is set to beyond the gap depth D, i.e., D'=D. This is done so for determining the gap depth D which has influence on the magnetic properties. In this embodiment, the position D' is set to D'=D+50 μm. The chamfer angle θ is usually about θ=45°. In this embodiment, it is set to 45°. In the magnetic head 1 in Embodiment 2, the roll-off is similar to that in Embodiment 1. The play back efficiency is slightly reduced compared to the magnetic head in Embodiment 1, as shown in Table 2. However, compared to the magnetic head 1 in Embodiment 1, the magnetic head 1 in Embodiment 2 has an advantage that the winding is facilitated owing to the presence of the third chamfered portion 26.

Embodiment 3

Figure 5:
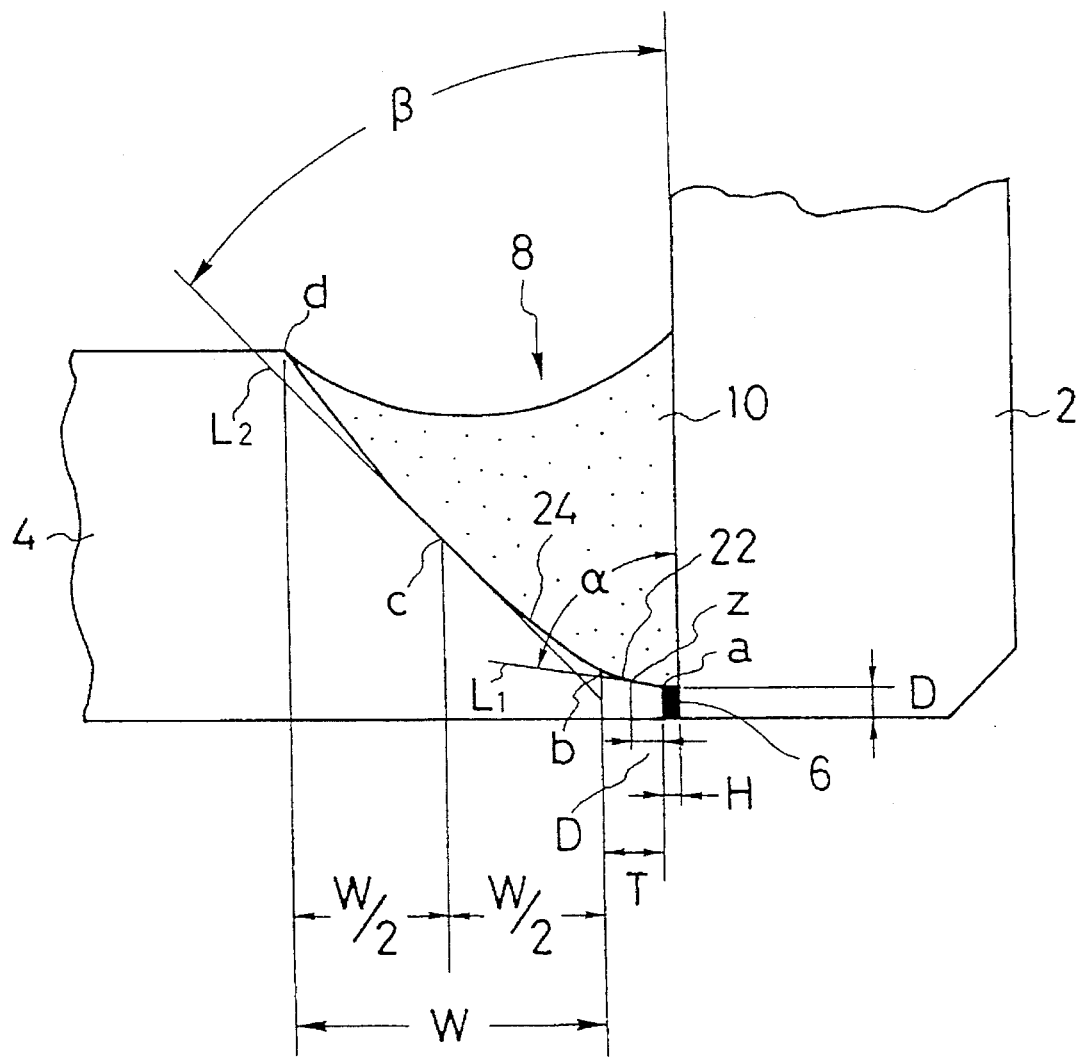
FIG. 5 is a front view showing a further embodiment of the magnetic head according to the invention.
Figure 6:
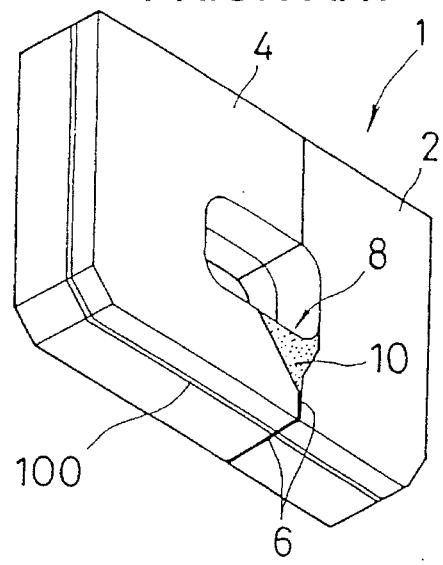
FIG. 6 is a perspective view showing a prior art example of magnetic head.
Figure 7:
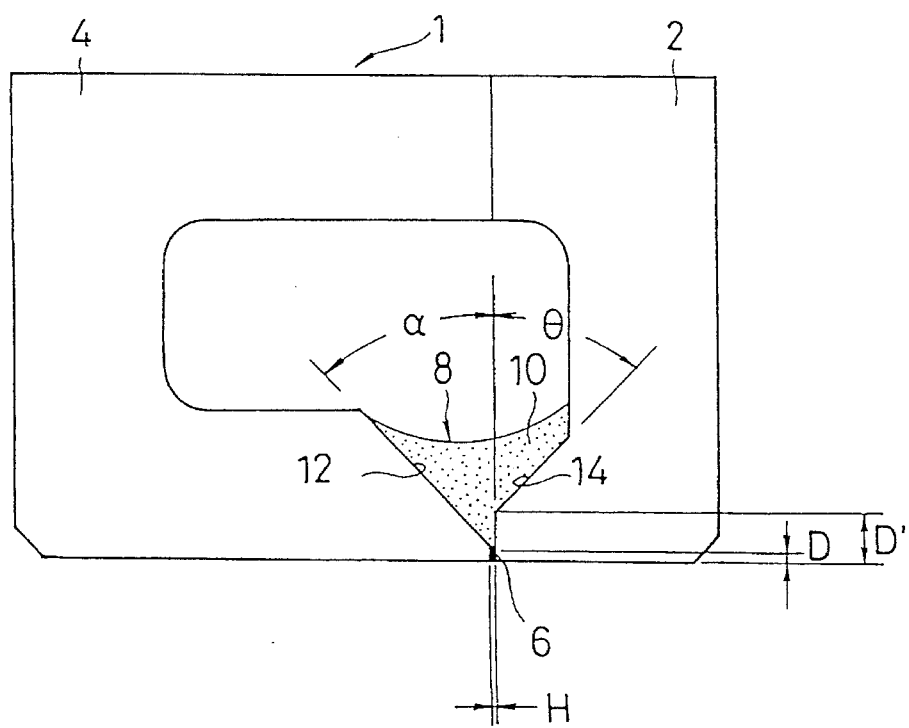
FIG. 7 is a front view showing a prior art example of magnetic head.

FIG. 5 shows Embodiment 3 of the magnetic head 1 according to the invention. In the previous embodiments shown in FIGS. 1A and 1B, and so forth, the first and second chamfered portion 22 and 24 are formed in the C core such that they have straight profiles. In this embodiment, however, they have curved profiles.

In this case, the chamfer angles, i.e., first and second apex angles α and β, can be defined as follows.

The first apex angle α is an opening angle of the line L1, which connects a position (a) corresponding to the gap depth D of the first chamfered portion 22 and a position (z) on the first chamfered portion 22 spaced apart from the gap face by a distance corresponding to the gap depth, from a plane parallel to the mating surfaces of the I and C cores 2 and 4.

The second apex angle β is an inclination angle of the second chamfered portion 24 at an intermediate position (c)(W/2) between at a position (b) on the second chamfered portion 24 at the apex length T and other position (d) on the second chamfered portion 24 at distance W from the apex length T as measured in the direction normal to the faces of the gap 6. That is, the second apex angle β is the opening angle between line L2, which is tangential to the second chamfered portion 24 at the intermediate position (c) thereof, and a plane parallel to the mating surfaces of the I and C cores 2 and 4.

While in the above embodiments the magnetic film of the magnetic head 1 according to the invention has been described in connection with the Fe-Si-Al alloy magnetic materials, it is also possible to use amorphous magnetic material, iron nitride magnetic material, etc.

POSSIBILITY OF THE INDUSTRIAL UTILIZATION

As has been described in the foregoing, with the magnetic head according to the invention the apex portion has a first chamfered portion and a second chamfered portions both formed in the C core, the first chamfered portion being formed such as to have a first apex angle α at a position D corresponding to a predetermined gap depth and have a predetermined apex length, the second chamfered portion being contiguous to the first chamfered portion and having a second apex angle β smaller than the first apex angle α. The magnetic head according to the invention thus is excellent in both the recording ability and play back efficiency, and thus it can be suitably used as high density recording heads for high frequency purposes, for which high signal-to-noise ratio is required, mainly video heads and computer purpose heads.

What is claimed is:

1. A magnetic head comprising a pair of magnetic core halves with mating surfaces thereof bonded together via a gap, an apex portion being formed adjacent said gap, said apex portion having a first chamfered portion and a second chamfered portion both formed in one of said magnetic core halves, said first chamfered portion having a first apex angle α at a position D corresponding to a predetermined gap depth and a predetermined apex length, the second chamfered portion being contiguous to the first chamfered portion and having a second apex angle β smaller than the first apex angle α, said first apex angle α being $70°≦α≧80°$.

2. The magnetic head according to claim 1, wherein said first and second chamfered portions have straight or curved profiles.

3. The magnetic head according to claim 2, wherein said second apex angle β is $30°≦β≦60°$.

4. The magnetic head according to claim 3, wherein said apex portion further has a third chamfered portion formed in the other one of said magnetic core halves, said third chamfered portion having a third apex angle θ at a position D' beyond said gap depth position D.

5. The magnetic head according to claim 2, wherein said apex portion further has a third chamfered portion formed in the other one of said magnetic core halves, said third chamfered portion having a third apex angle θ at a position D' beyond said gap depth position D.

6. The magnetic head according to claim 1, wherein said second apex angle β is $30°≦β≦60°$.

7. The magnetic head according to claim 6, wherein said apex portion further has a third chamfered portion formed in the other one of said magnetic core halves, said third chamfered portion having a third apex angle θ at a position D' beyond said gap depth position D.

8. The magnetic head according to claim 1, wherein said apex portion further has a third chamfered portion formed in the other one of said magnetic core halves, said third chamfered portion having a third apex angle θ at a position D' beyond said gap depth position D.

9. The magnetic head according to claim 1, wherein said first apex angle α is $70°≦α≦75°$.

10. The magnetic head according to claim 9, wherein said first and second chamfered portions have straight or curved profiles.

11. The magnetic head according to claim 9, wherein said second apex angle β is $30°≦β≦60°$.

* * * * *